(12) United States Patent
Chen

(10) Patent No.: US 8,621,716 B2
(45) Date of Patent: Jan. 7, 2014

(54) ANGLE POSITIONING DEVICE OF ROTATION SHAFT AND FOLDABLE ELECTRONIC DEVICE HAVING THE SAME

(75) Inventor: Shun-Bin Chen, Tapei Hsien (TW)

(73) Assignee: Acer Inc., Taipei Hsien (TW)

( * ) Notice: Subject to any disclaimer, the term of this patent is extended or adjusted under 35 U.S.C. 154(b) by 340 days.

(21) Appl. No.: 12/627,029

(22) Filed: Nov. 30, 2009

(65) Prior Publication Data

US 2011/0051326 A1    Mar. 3, 2011

(30) Foreign Application Priority Data

Sep. 3, 2009    (TW) .............................. 98129759 A

(51) Int. Cl.
*E05D 11/10*    (2006.01)
(52) U.S. Cl.
USPC ................... 16/325; 16/319; 16/333; 16/335; 361/679.27; 361/679.55; 361/679.58
(58) Field of Classification Search
USPC ........... 16/319, 321, 323, 326, 327, 333, 335, 16/374, 377, 375, 330, 303, 236, 296, 312, 16/367, 325, 334, 344, 354; 361/679.27, 361/679.55, 679.57, 679.58; 379/433.13; 74/575–578; 455/575.3
See application file for complete search history.

(56) References Cited

U.S. PATENT DOCUMENTS

| | | | | |
|---|---|---|---|---|
| 6,108,868 A | * | 8/2000 | Lin | 16/340 |
| 6,148,480 A | * | 11/2000 | Cooke | 16/303 |
| 6,361,118 B1 | * | 3/2002 | Melgarejo et al. | 297/488 |
| 7,100,239 B2 | * | 9/2006 | Duan et al. | 16/303 |
| 7,159,279 B2 | * | 1/2007 | Liu et al. | 16/367 |
| 7,375,956 B2 | * | 5/2008 | Chuang et al. | 361/679.55 |
| 7,478,458 B2 | * | 1/2009 | Tajima | 16/367 |
| 2006/0080805 A1 | * | 4/2006 | Takagi | 16/326 |
| 2006/0193469 A1 | * | 8/2006 | Kfoury | 379/433.13 |
| 2006/0218750 A1 | * | 10/2006 | Tajima | 16/367 |
| 2007/0039134 A1 | * | 2/2007 | Lu et al. | 16/330 |
| 2007/0039135 A1 | * | 2/2007 | Duan et al. | 16/330 |
| 2007/0294859 A1 | * | 12/2007 | Hsu et al. | 16/330 |
| 2010/0275413 A1 | * | 11/2010 | Kim | 16/303 |

* cited by examiner

*Primary Examiner* — Emily Morgan
(74) *Attorney, Agent, or Firm* — Alan Kamrath; Kamrath IP Lawfirm, P.A.

(57) ABSTRACT

An angle positioning device of a rotation shaft includes a first pivot portion and a second pivot portion. The first pivot portion includes a first face having a positioning portion, a first path and a second path divided by the positioning portion. The first pivot portion includes a second face having a returning portion, a third path and a fourth path divided by the returning portion. The second pivot portion can move along the first path, the second path, the third path, and the fourth path. When the second pivot portion moves from the first path to the second path, the pivot angle is increased. When the second pivot portion moves from the third path to the fourth path, the pivot angle is decreased. When the pivot portion moves from the first path to the positioning portion, the pivot angle cannot be decreased. The second pivot portion can move from the third path through the returning portion and back to the first path.

13 Claims, 8 Drawing Sheets

ANGLE POSITIONING DEVICE OF ROTATION SHAFT AND FOLDABLE ELECTRONIC DEVICE HAVING THE SAME

BACKGROUND OF THE INVENTION

1. Field of the Invention

The present invention relates to a positioning device and an electronic device thereof and, more particularly, to an angle positioning device of a rotation shaft and an electronic device thereof.

2. Description of the Related Art

Foldable electronic devices are commonly used in electronic equipment. In a dual display screen laptop, for example, the angle between the cover piece and the body piece of the dual display screens is approximately 250 to 270 degrees (forming an inverted V-shape), which allows two users to view the screen from opposite sides. This facilitates the process of presentation or participation in a computer game by two players.

However, if there is no angle positioning device on the rotation shaft to maintain the angle between the cover piece and the body piece at 250 to 270 degrees, the weight of the cover piece and the body piece can easily cause the parts to slide downwards, thus causing the angle to deviate and the inverted V-shape to no longer be maintained.

Therefore, it is necessary to provide a rotation shaft angle positioning device for a foldable electronic device in order to resolve the aforementioned problem.

SUMMARY OF THE INVENTION

The object of the present invention is to provide a rotation shaft angle positioning device for a foldable electronic device.

Another object of the present invention is to provide an electronic device comprising a rotation shaft angle positioning device.

To achieve the above mentioned objects, the present invention provides a foldable electronic device consisting of a cover piece, a body piece, and a rotation shaft angle positioning device. A pivot angle is formed between the cover piece and the body piece. The rotation shaft angle positioning device comprises a first pivot portion and a second pivot portion. The first pivot portion comprises a first face and a second face. The first face comprises a positioning portion, a first ramp and a second ramp divided by the positioning portion. The second face comprises a returning portion, a third ramp and a fourth ramp divided by the returning portion. The second pivot portion can move along the first ramp, the second ramp, the third ramp, and the fourth ramp. When the second pivot portion moves from the first ramp to the second ramp, the pivot angle is increased. When the second pivot portion moves from the third ramp to the fourth ramp, the pivot angle is decreased. When the pivot portion moves from the first ramp to the positioning portion, the pivot angle cannot be decreased. The second pivot portion can move from the third ramp through the returning portion to return to the first ramp.

According to one embodiment of the present invention, the second pivot portion comprises: a pivot mechanism pivotally connected to the first pivot portion; a driving unit pivotally connected to the pivot mechanism and comprising a hook portion; with the hook portion moving along the first ramp, the second ramp, the third ramp, and the fourth ramp; a converging portion used to move the hook portion from the second ramp to the third ramp; and a spring unit connected to the driving unit. The spring unit provides the driving unit with the force needed to press the hook portion on the first ramp, the second ramp, the third ramp, and the fourth ramp, and also the force needed to move the hook portion from the fourth ramp to the first ramp.

DETAILED DESCRIPTION OF THE PREFERRED EMBODIMENTS

The advantages and innovative features of the invention will become more apparent from the following preferred embodiments.

Figure 1:
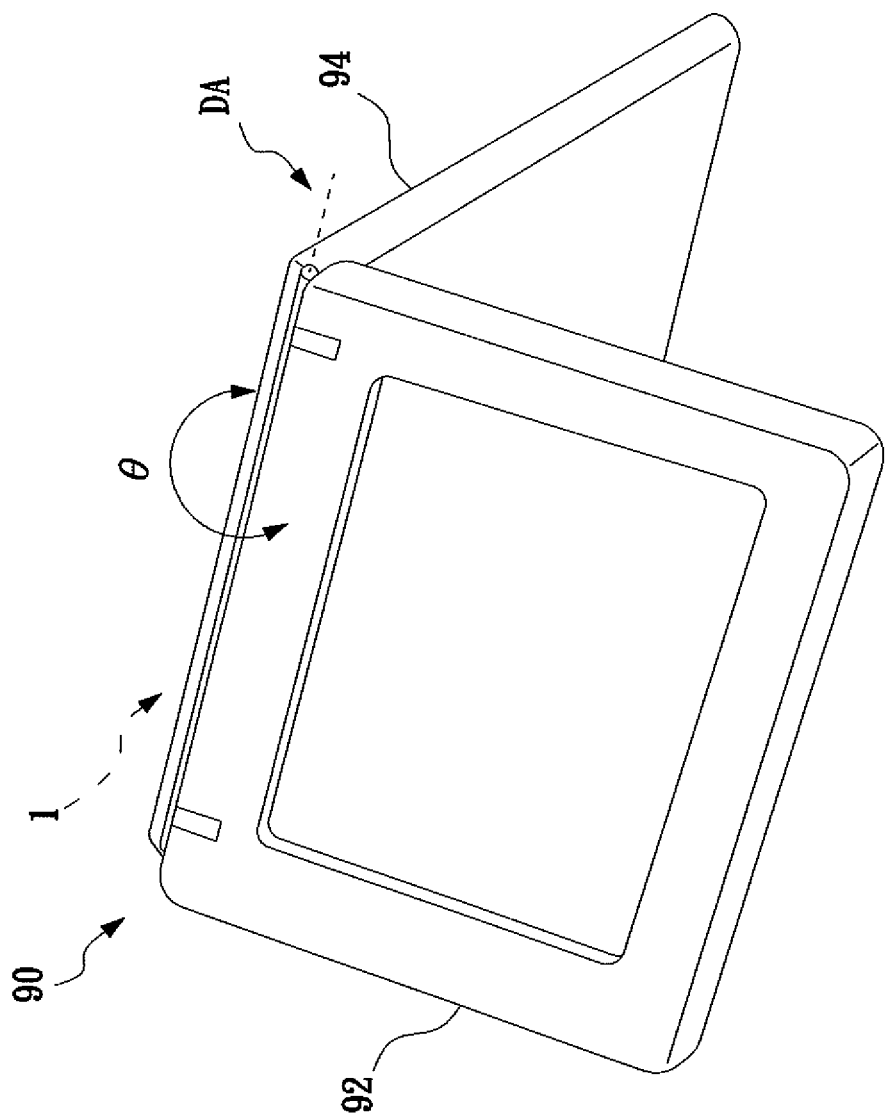
FIG. 1 shows a foldable electronic device of the present invention.

Refer to FIG. 1 for a foldable electronic device 90 of the present invention. The foldable electronic device 90 consists of a cover piece 92, a body piece 94, and a rotation shaft angle positioning device 1. The cover piece 92 and the body piece 94 are connected about a device pivot axis DA. A pivot angle θ is formed between the cover piece 92 and the body piece 94. In the embodiment shown in FIG. 1, the pivot angle θ of the foldable electronic device 90 is locked at 250 degrees.

For example, when the foldable electronic device 90 is a dual screen laptop with θ=250 degrees, two people can view the screen from opposite sides at this position. It can be used for a presentation or for a computer game with two players, such as a card game. Please note that the foldable electronic device 90 of the present invention is not limited to the above-mentioned configuration.

Figure 2:
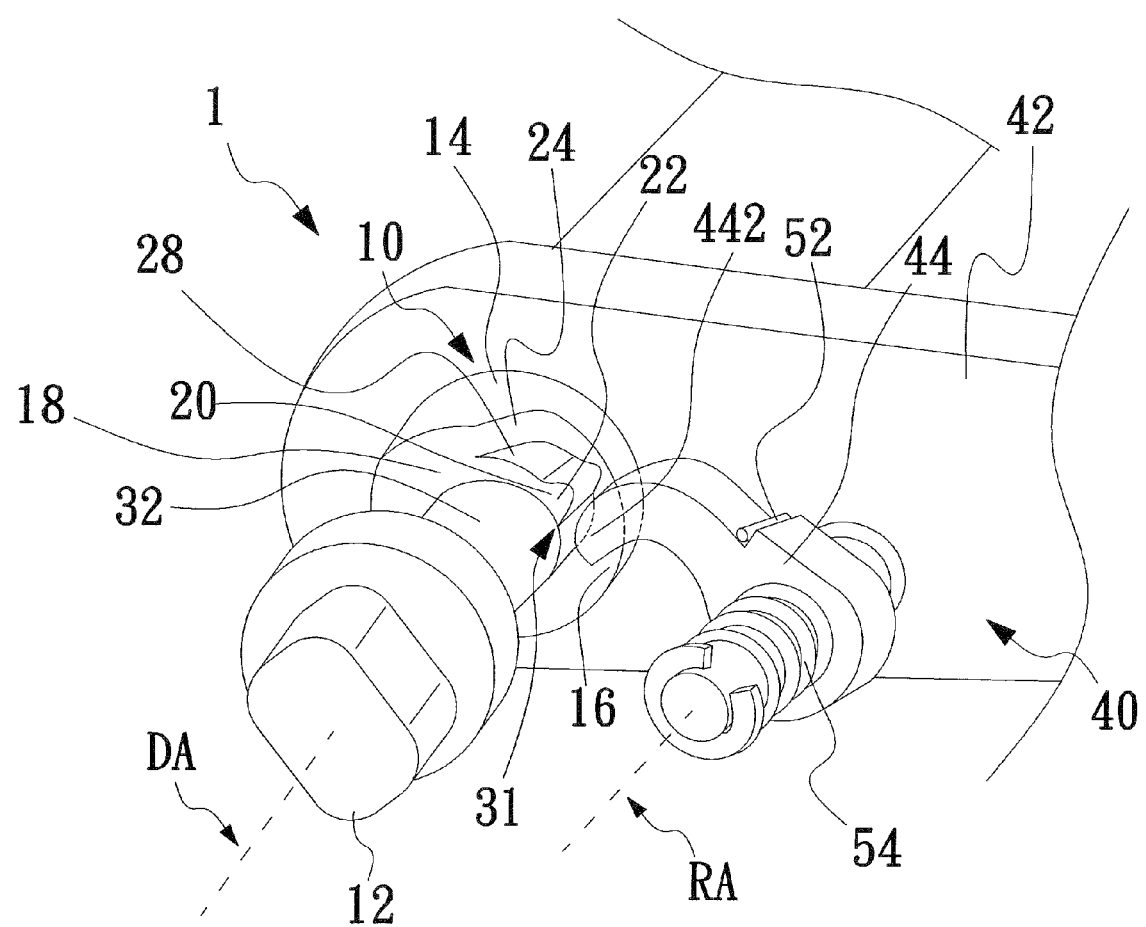
FIG. 2 shows the hook portion of a rotation shaft angle positioning device located in the first ramp.

Next refer to FIG. 2, which shows the hook portion 442 located at the first path of the rotation shaft angle positioning device 1. The rotation shaft angle positioning device 1 comprises a first pivot portion 10 and a second pivot portion 40. In the present embodiment, the first pivot portion 10 is connected to the body piece 94 of the foldable electronic device 90, and the second pivot portion 40 is connected to the cover piece 92 of the foldable electronic device 90 about a driving axis RA. Thus, a fixed side is formed by the first pivot portion 10 and the body piece 94, and a rotational side is formed by the second pivot portion 40 and the cover piece 92.

Please note that the connecting position of the first pivot portion 10 and the second pivot portion 40 is not limited to the aforementioned position. For example, the first pivot portion 10 can be connected to the cover piece 92, and the second pivot portion 40 can be connected to the body piece 94.

The first pivot portion 10 comprises a shaft 12 along the device axis DA and a flange 14 having a first face and a second face. The flange 14 includes a lower surface 16, an upper surface 18 and a coplanar surface 20. In the present embodiment, the flange 14 has a curved surface comprising a positioning protrusion or portion 22, a ramped converging portion 24, a first ramp 26, and a second ramp 28. The first ramp 26 and the second ramp 28 of the first face are divided by the positioning portion 22, and the positioning portion 22 and the converging portion 24 are located at opposite ends of the second ramp 28. Thus, the ramped converging portion 24 connects the lower and upper surfaces 16 and 18. The positioning protrusion or portion 22 extends from the shaft 12 adjacent a corner of the lower surface 16 and the ramped converging portion 24 and includes the coplanar surface 20 level with and connected to the upper surface 18. The positioning portion 22 is used to lock the hook portion 442, and the converging portion 24 is used to move the hook portion 442 in an axial direction along the driving axis RA from the second ramp 28 to the third ramp 32. Although the positioning portion 22 has a protruding shape as shown in the present embodiment, the positioning portion 22 is not limited to this shape.

In the present embodiment, the second face has a curved surface and is adjacent to the first face. The second face comprises a returning portion 31, a third ramp 32, and a fourth ramp 34. The third ramp 32 and the fourth ramp 34 of the second face are divided by the returning portion 31. The third ramp 32 is relatively radially inward of the second ramp 28 such that the third ramp 32 forms a groove, and the fourth ramp 34 is not relatively radially inward of the first ramp 26. In the present invention, the first ramp 26 and the fourth ramp 34 are on the same surface. Please note that the first ramp 26 can also be relatively radially inward of the fourth ramp 34.

The second pivot portion 40 comprises a pivot mechanism 42, a driving unit 44, and a spring unit. The pivot mechanism 42 is pivotally connected to the first pivot portion 10. In the present embodiment, the pivot mechanism 42 is connected to the cover piece 92. Therefore, when the user rotates the cover piece 92, it will also cause the pivot mechanism 42 to move. One end of the driving unit 44 is pivotally connected to the pivot mechanism 42 about the driving axis RA, and the other end of the driving unit 44 comprises the hook portion 442.

The hook portion 442 can move along the first ramp 26, the second ramp 28, the third ramp 32, and the fourth ramp 34. The pivot angle θ gradually increases as the hook portion 442 moves from the first ramp 26 to the second ramp 28. The pivot angle θ gradually decreases as the hook portion 442 moves from the third ramp 32 to the fourth ramp 34.

The spring unit is connected to the driving unit 44. The spring unit allows the hook portion 442 of the driving unit 44 to exert force in a specific direction. In the present embodiment, the spring unit comprises a first spring piece 52 and a second spring piece 54. The first spring piece 52 provides the force needed to press the hook portion 442 of the driving unit 44 against the shaft 14 and the first ramp 26, the second ramp 28, the third ramp 32, and the fourth ramp 34. The second spring piece 54 provides the force required to move the hook portion 442 of the driving unit 44 in an opposite axial direction along the driving axis RA towards the lower surface 16 and from the fourth ramp 34 to the first ramp 26.

In the present embodiment, the first spring piece 52 is a torsion spring, and the second spring piece 54 is a compression spring. The direction of the force applied by the first spring piece 52 and the second spring piece 54 is substantially perpendicular.

When the hook portion 442 moves from the first ramp 26 to the positioning portion 22, a "set position" or "locking position" is attained. At this position, the pivot angle θ cannot be decreased, so the cover piece 92 is in a position which cannot be rotated. Thus, the objective of providing a rotation shaft angle positioning device 1 is achieved. In the present embodiment, when the rotation shaft angle positioning device 1 is at the set position, the pivot angle θ lies between 250 to 270 degrees. However, the pivot angle θ can be designed according to user requirements.

When the hook portion 442 moves from the third ramp 32 to the returning portion 31, a "returning position" is attained. At the "returning position" in the present embodiment, the pivot angle θ lies between 180 to 240 degrees. However, the pivot angle θ is not limited to this range. The hook portion 442 can move along the third ramp 32. As the hook portion 442 moves past the returning portion 31, the hook portion 442 will land on the fourth ramp 34. Next, the second spring piece 54 aids the hook portion 442 to move from the fourth ramp 34 back to the first ramp 26.

The subsequent section will describe the actual movement of the rotation shaft angle positioning device 1 in different stages. In the following embodiment, the pivot angle θ of the set position is set at 250 degrees, and the pivot angle θ of the returning position is set at 200 degrees.

(1) Hook Portion 442 Located at First Ramp 26

Refer to FIG. 2. When the user opens the foldable electronic device 90 from a pivot angle θ of 0 degrees (completely closed) to less than 250 degrees, the pivot mechanism 42 and the driving unit 44 will rotate simultaneously, and the hook portion 442 of the driving unit 44 will slide along the first ramp 26 of the first face.

At this stage, the hook portion 442 has not yet moved into the positioning portion 22. Therefore, the cover piece 92 and the body piece 94 of the foldable electronic device 90 are not in a set position.

(2) Hook Portion 442 Located at Positioning Portion 22

Figure 3:
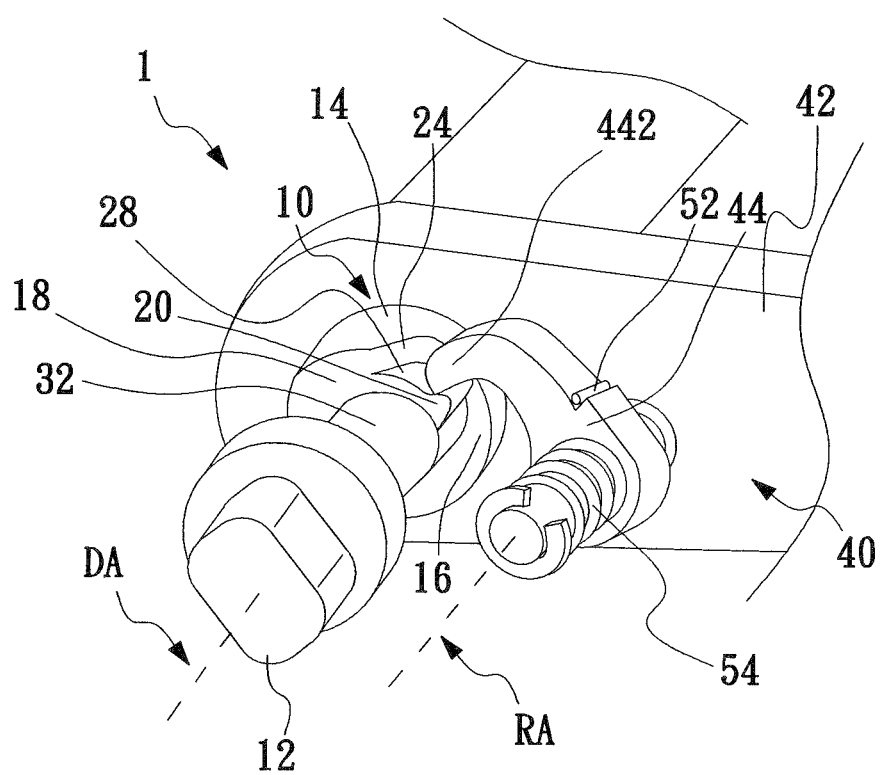
FIG. 3 shows the hook portion of a rotation shaft angle positioning device located at the positioning portion.

Refer to FIG. 3, which shows the hook portion 442 of a rotation angle positioning device 1 locating at the positioning portion 22. Assuming the user continues to open the cover piece 92 of the foldable electronic device 90 as mentioned in stage (1), the pivot angle θ will reach 250 degrees. At this instant, the hook portion 442 arrives at a protruding shape of the positioning portion 22, and the shape of the positioning portion 22 causes the hook portion 442 to lift slightly and move into the intersection between the positioning portion 22 and the second ramp 28 (as shown in FIG. 3). A set position is attained when the rotation shaft angle positioning device 1 is in this configuration.

Under this situation, the positioning portion 22 restricts the movement of the hook portion 442. As a result, the user cannot rotate the cover piece 92 in the reverse direction. Therefore, the foldable electronic device 90 can be stably mounted onto a flat surface (as shown in FIG. 1).

(3) Hook Portion 442 Located at Converging Portion 24

Figure 4:
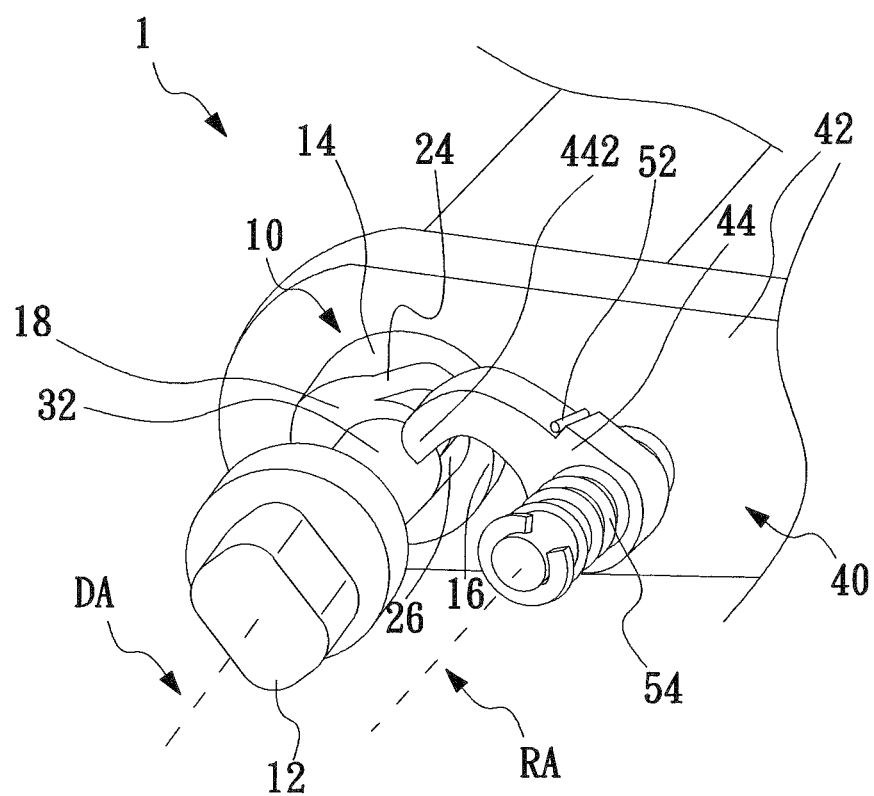
FIG. 4 shows the hook portion of the rotation shaft angle positioning device located at the converging portion.
Figure 5:
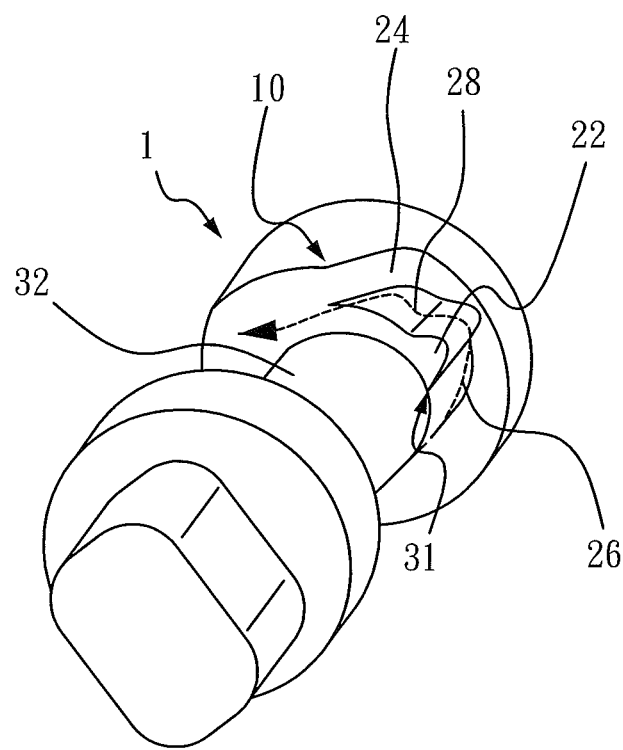
FIG. 5 shows the trail of the hook portion of the rotation shaft angle positioning device moving from the second ramp to the third ramp.

Refer to FIG. 4 and FIG. 5 simultaneously. FIG. 4 shows the hook portion 442 of the rotation shaft angle positioning device 1 located at the converging portion 24. FIG. 5 shows the trail of the hook portion 442 of the rotation shaft angle positioning device 1 moving from the second ramp 28 to the third ramp 32. In order to present the trail of the hook portion 442 more clearly, the trail is represented by a dashed arrow, and the hook portion 442 is excluded from FIG. 5.

If the user wants to unlock the position of the rotation shaft angle positioning device 1, the cover piece 92 must be continuously opened to increase the pivot angle θ. Under this circumstance, the hook portion 442 moves along the second ramp 28 in the direction of the arrow shown in FIG. 5. When the hook portion 442 moves to the slanted surface of the converging portion 24, the hook portion 442 will be guided by the converging portion 24, causing the hook portion 442 to move from the second ramp 28 along the converging portion 24 in an axial direction along the driving axis RA towards the third ramp 32. In the present embodiment, the hook portion 442 moves along the converging portion 24 when the pivot angle θ is between 250 and 270 degrees.

(4) Hook Portion 442 Located on the Third Ramp 32

Figure 6:
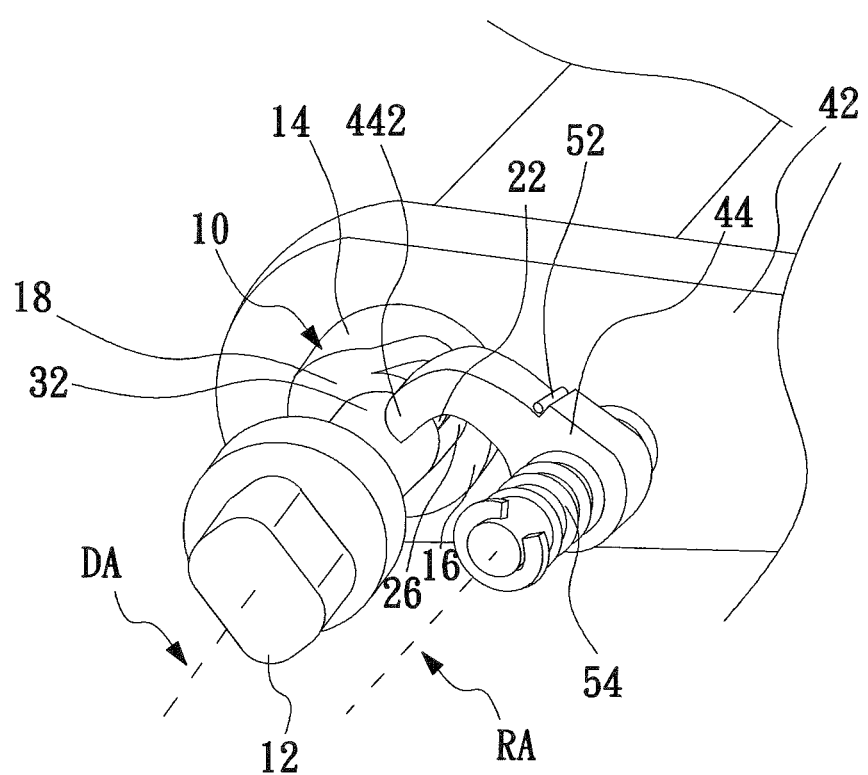
FIG. 6 shows the hook portion of the rotation shaft angle positioning device located in the third ramp.
Figure 7:
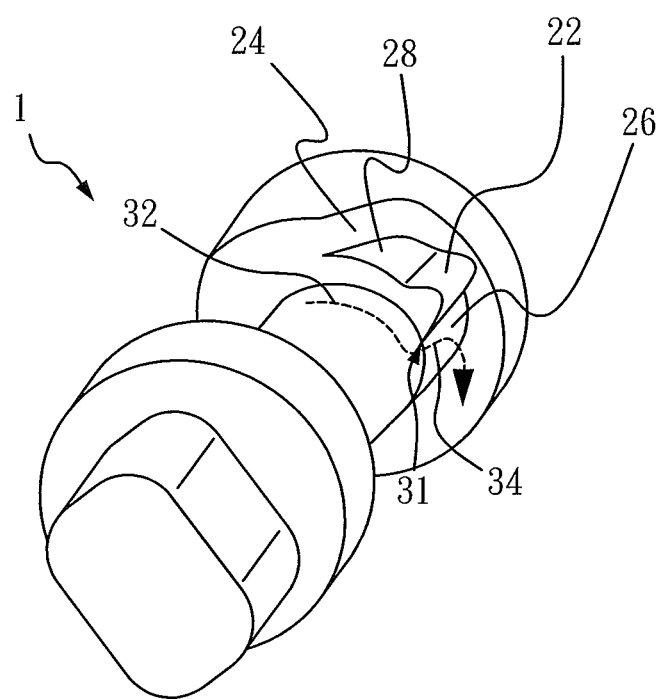
FIG. 7 shows the trail of the hook portion of the rotation shaft angle positioning device moving along the third ramp and the fourth ramp, and then into the first ramp.

Refer to FIG. 6 and FIG. 7 simultaneously. FIG. 6 shows the hook portion 442 of the rotation shaft angle positioning device 1 located on the third ramp 32. FIG. 7 shows the trail of the hook portion 442 of the rotation shaft angle positioning device moving from the third ramp 32 and the fourth ramp 34 and into the first ramp 26. In order to present the trail of the hook portion 442 more clearly, the trail is represented by a dashed arrow, and the hook portion 442 is excluded from FIG. 7.

As the pivot angle θ, as mentioned in stage (3), increases continuously, the hook portion 442 will be guided by the converging portion 24 and reach the third ramp 32. The first spring piece 52 will cause the hook portion 442 to move into the groove of the third ramp 32 (as shown in FIG. 6). In the present embodiment, the hook portion 442 enters into the third ramp 32 when the pivot angle θ is 270 degrees.

At this instant, the hook portion 442 will be restricted by the side wall of the groove. Thus, the hook portion 442 will be able to move only along the third ramp 32. At this stage, the hook portion 442 moves along the third ramp 32 and will not come into contact with the positioning portion 22.

Next, the user can move the cover piece 92 of the foldable electronic device 90 backward such that the pivot angle θ gradually decreases, and the hook portion 442 will slide along the third ramp 32 (in the direction of the arrow shown in FIG. 7).

(5) Hook Portion 442 Located at Returning Portion 31

Figure 8:
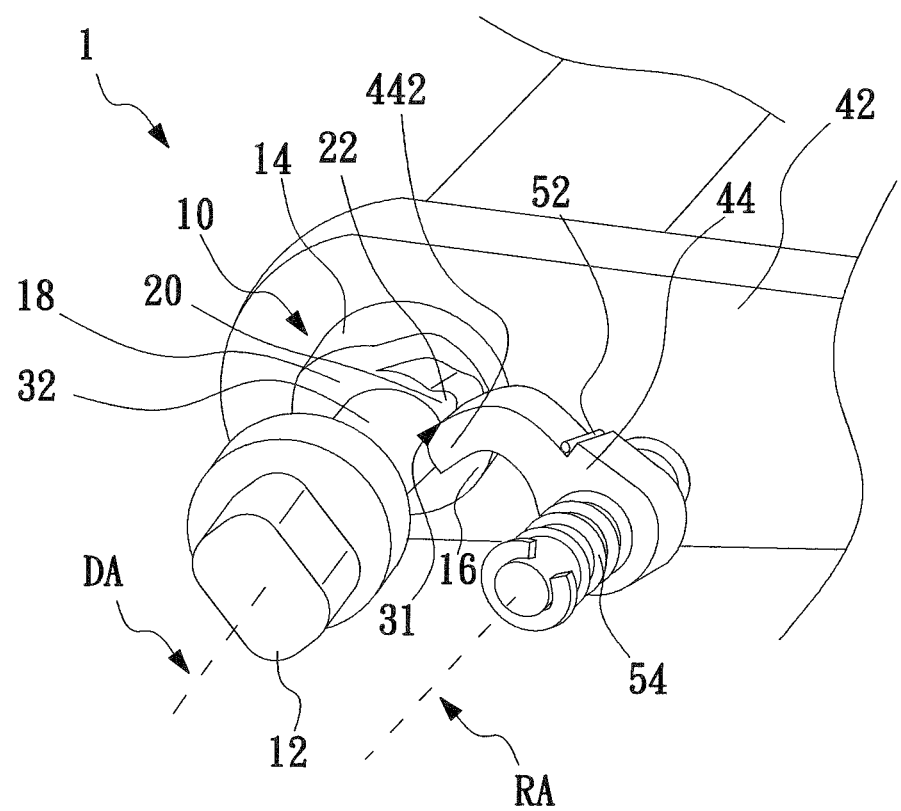
FIG. 8 shows the hook portion of the rotation shaft angle positioning device located on the returning portion.

Refer to FIG. 7 and FIG. 8 simultaneously. FIG. 8 shows the hook portion 442 of the rotation shaft angle positioning device 1 located at the returning portion 31. As the pivot angle θ gradually decreases, as described in stage (4), the hook portion 442 moves along the third ramp 32 and reaches the returning portion 31. At this stage, there is no side wall on the groove to restrict the movement of the hook portion 442, and the force of the second spring piece 54 will move the hook portion 442 in an opposite axial direction along the driving axis RA from the third ramp 32 into the fourth ramp 34. The fourth ramp 34 is the path linking the third ramp 32 and the first ramp 26.

Next, the force of the second spring piece 54 will move the hook portion 442 from the fourth ramp 34 back to the first ramp 26. At this instant, the rotation shaft angle positioning device 1 returns to an unlocked state, as described in stage (1). In the present embodiment, as the pivot angle θ decreases to 200 degrees, the hook portion 442 will move along the third ramp 32, then the fourth ramp 34, and then back to the first ramp 26.

Next, the user can decrease the pivot angle θ continuously, such that the hook portion 442 moves along the first ramp 26 (as shown in FIG. 7) until the pivot angle θ becomes 0 degrees. At this instant, the foldable electronic device 90 is in a completely closed state.

The abovementioned steps from stage (1) to stage (5) are repetitive. The next time the user wishes to use the foldable electronic device 90 to set the position of the cover piece 92 and the body piece 94, steps (1) and (2) of the process will be performed, and if the user wishes to reset the position, the process then proceeds to step (3) through step (5).

Although the present invention has been explained in relation to its preferred embodiments, it is also of vital importance to acknowledge that many other possible modifications and variations can be made without departing from the spirit and scope of the invention as hereinafter claimed.

The invention claimed is:

1. A rotation shaft angle positioning device for a foldable electronic device having a cover and a body pivotally connected to each other, wherein the rotation shaft angle positioning device comprises:
   a device axis and a driving axis parallel to and spaced from the device axis;
   a first pivot portion adapted to be connected to one of the cover and the body, comprising:
      a shaft along the device axis, and a flange, with the flange comprising: a lower surface and an upper surface connected by a ramped converging portion, and a positioning protrusion extending from the shaft adjacent a corner of the lower surface and the ramped converging portion; and
   a second pivot portion comprising a driving unit along the driving axis parallel to and spaced from the device axis, and adapted to pivotally connect to the other of the cover and the body, with the driving unit comprising: a hook portion and a spring unit connected to the hook portion, wherein the spring unit urges the hook portion towards the shaft and the lower surface of the first pivot portion; and
   wherein:
      movement of the rotation shaft angle positioning device in a first rotational direction is different than the movement along an opposite rotational direction,
      rotation of the first pivot portion in the first direction allows the cover to rotate through a locking position between the positioning protrusion and the corner, with the hook portion rotating against the lower surface, the positioning protrusion, the ramped converging portion and the upper surface in turn, and
      rotation of the first pivot portion in the opposite direction allows the cover to rotate without rotating through the locking position, with the hook portion rotating against the upper surface, the surface coplanar to the upper surface and the lower surface in turn.

2. The rotation shaft angle positioning device as claimed in claim 1, wherein with the positioning protrusion further comprising a coplanar surface level with and connected to the upper surface.

3. The rotation shaft angle positioning device as claimed in claim 1, wherein the spring unit comprises a first spring piece and a second spring piece; wherein the first spring piece provides the hook portion of the driving unit with a force to press the hook portion against the shaft; and wherein the second spring piece provides a force to axially move the hook portion along the driving axis towards the lower surface.

4. The rotation shaft angle positioning device as claimed in claim 3, wherein the first spring piece is a torsion spring and the second spring piece is a compression spring.

5. The rotation shaft angle positioning device as claimed in claim 4, wherein directions of the forces applied by the first spring piece and the second spring piece are substantially perpendicular.

6. The rotation shaft angle positioning device as claimed in claim 3, wherein the first pivot portion is adapted to be connected to the body, and wherein the second pivot portion is adapted to be connected to the cover.

7. The rotation shaft angle positioning device as claimed in claim 3, wherein the first pivot portion is adapted to be connected to the cover, and wherein the second pivot portion is adapted to be connected to the body.

8. A foldable electronic device with a rotation shaft angle positioning device, comprising a rotation shaft angle positioning device as claimed in claim 1.

9. The rotation shaft angle positioning device as claimed in claim 1, wherein the first pivot portion is adapted to be connected to the cover, and wherein the second pivot portion is adapted to be connected to the body.

10. The rotation shaft angle positioning device as claimed in claim 1, wherein the first pivot portion is adapted to be connected to the body, and wherein the second pivot portion is adapted to be connected to the cover.

11. The rotation shaft angle positioning device as claimed in claim 10, wherein the spring unit comprises a first spring piece and a second spring piece; wherein the first spring piece provides the hook portion of the driving unit with a force to press the hook portion against the shaft; and wherein the second spring piece provides a force to axially move the hook portion along the driving axis towards the lower surface.

12. The rotation shaft angle positioning device as claimed in claim 11, wherein the first spring piece is a torsion spring and the second spring piece is a compression spring.

13. The rotation shaft angle positioning device as claimed in claim 12, wherein directions of the forces applied by the first spring piece and the second spring piece are substantially perpendicular.

* * * * *